(12) United States Patent
Mudalige

(10) Patent No.: US 8,103,449 B2
(45) Date of Patent: Jan. 24, 2012

(54) CONFIGURABLE VEHICULAR TIME TO STOP WARNING SYSTEM

(75) Inventor: Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 629 days.

(21) Appl. No.: 12/257,900

(22) Filed: Oct. 24, 2008

(65) Prior Publication Data

US 2010/0106413 A1  Apr. 29, 2010

(51) Int. Cl.
*G01C 21/00* (2006.01)
*G08G 1/16* (2006.01)

(52) U.S. Cl. ......................... 701/213; 701/301
(58) Field of Classification Search .............. 701/213, 701/300–302
See application file for complete search history.

(56) References Cited

U.S. PATENT DOCUMENTS

| | | | |
|---|---|---|---|
| 4,366,821 A | 1/1983 | Wittmaier et al. | |
| 5,559,495 A | 9/1996 | Cochran | |
| 5,900,805 A | 5/1999 | Knight | |
| 5,940,010 A * | 8/1999 | Sasaki et al. | 340/901 |
| 6,087,943 A | 7/2000 | Bailey | |
| 6,630,891 B1 | 10/2003 | Dilling | |
| 6,633,238 B2 * | 10/2003 | Lemelson et al. | 340/909 |
| 6,813,562 B2 | 11/2004 | Altan et al. | |
| 7,317,406 B2 * | 1/2008 | Wolterman | 340/917 |
| 7,821,421 B2 * | 10/2010 | Tamir et al. | 340/901 |
| 7,825,825 B2 * | 11/2010 | Park | 340/907 |
| 2002/0198632 A1 * | 12/2002 | Breed et al. | 701/1 |
| 2003/0063015 A1 * | 4/2003 | Ebner et al. | 340/907 |
| 2005/0156757 A1 * | 7/2005 | Garner | 340/907 |
| 2005/0237224 A1 * | 10/2005 | Gotfried | 340/929 |
| 2006/0044119 A1 | 3/2006 | Egelhaaf | |
| 2007/0222638 A1 * | 9/2007 | Chen et al. | 340/901 |
| 2007/0244643 A1 * | 10/2007 | Tengler et al. | 701/301 |
| 2007/0276600 A1 * | 11/2007 | King et al. | 701/301 |
| 2008/0024284 A1 | 1/2008 | Baratoff et al. | |
| 2009/0063030 A1 * | 3/2009 | Howarter et al. | 701/117 |

OTHER PUBLICATIONS

McNew, Justin, et al., "Driving the Future: Vehicles Draw Data from Roadside, Stoplights", GPS World, Aug. 2006, v. 17, n. 8, p. 40.*

* cited by examiner

*Primary Examiner* — Robert Morgan
*Assistant Examiner* — Robert Sorey

(57) ABSTRACT

A method is provided for determining when to issue an alert warning to a driver of a vehicle relating to an upcoming stopping location in a road of travel. Wireless messages transmitted from a remote entity to the vehicle are received. The messages contain information such as position data and other data affecting stopping of the vehicle. GPS data relating to instantaneous vehicle position in the road of travel is retrieved. A travel time until the vehicle reaches the stopping location is determined. A determination is made whether the driver has initiated braking. An advance notice period is determined for issuing a warning to the driver to decelerate the vehicle comprising the travel time plus a predetermined reaction time plus a selectable driver configured increment. A sensory warning to the driver of the vehicle is actuated if the advance notice period is less than the travel time and the driver has not initiated braking.

20 Claims, 3 Drawing Sheets

CONFIGURABLE VEHICULAR TIME TO STOP WARNING SYSTEM

BACKGROUND OF INVENTION

An embodiment relates generally to warning a driver of a vehicle of a stopping condition forward of vehicle.

Active safety and driver assistance features typically use a combination of multiple driver alert warning modalities to provide optimum and effective alerts to the driver a timely manner. The timing of such alert modalities plays an important role in determining the effectiveness and user acceptance of these features. Optimum warning times are highly subjective and vary with individual driving styles, therefore, warnings based on standard reaction times obtained from human factor studies may not be effective for every driver at every situation.

SUMMARY OF INVENTION

An advantage of an embodiment of the invention is to allow the driver to configure an alert warning timing based on the driver preference and style. The driver is allowed to tailor the warning time to eliminate nuisances (early) warnings or ineffective (late) warnings as subjectively determined by the driver. Another advantage is the use of an auto default setting which determines the warning time based on the driver profile and environmental factors.

An embodiment contemplates a method for determining when to issue an alert warning to a driver of a vehicle relating to an upcoming stopping location in a road of travel. Wireless messages transmitted from a remote entity to the vehicle is received. The message contains position data relating to the stopping location in the traveled road. GPS data relating to instantaneous vehicle position in the road of travel is retrieved. An instantaneous vehicle speed is determined. A travel time until the vehicle reaches the stopping location is determined. A determination is made whether the driver has initiated braking. An advance notice period is determined for issuing a warning to the driver to decelerate the vehicle comprising the vehicle travel time plus a predetermined reaction time plus a selectable driver configured increment. A sensory warning to the driver of the vehicle is actuated if the advance notice period is less than the vehicle travel time and the driver has not initiated braking.

An embodiment contemplates a vehicular warning system for alerting a driver of a vehicle of an upcoming stopping location in a road of travel. A host vehicle receiver is provided for receiving wireless messages from a remote entity's transmitting unit. The wireless messages include position data relating to a stopping location and lane locations in the traveled road of the driven vehicle. A GPS receiver determines an instantaneous vehicle position in the traveled road. A controller determines a travel time to reach the stopping location in response to the wireless message data and the onboard vehicle and GPS data. The controller determines an advance notice period for issuing a warning to the driver to initiate deceleration of the vehicle in response to travel time plus a predetermined reaction time plus a selectable driver configured increment. A driver vehicle interface actuates a sensory warning to the driver of the vehicle if the advance notice period is less than the vehicle travel time and the driver has not initiated braking.

DETAILED DESCRIPTION

Figure 1:
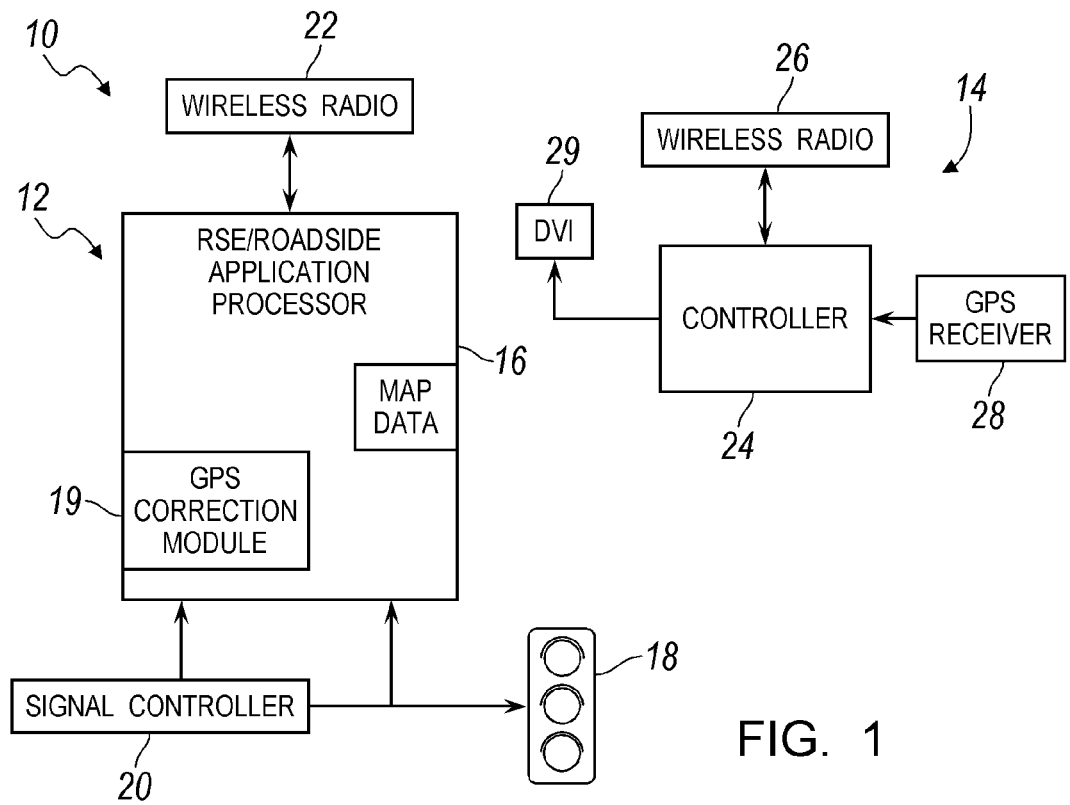
FIG. 1 is a block diagram of a vehicular warning system according to an embodiment of the invention.

FIG. 1 is a block diagram of a vehicular warning system 10 utilizing a selectable driver configured increment that allows the driver to configure the advance notice period to alert the driver of the vehicle to initiate deceleration (e.g., braking) of the vehicle. The system 10 is utilized in cooperation with an infrastructure-to-vehicle (I2V) system or a vehicle-to-vehicle (V2V) system. In an I2V system, as illustrated in FIG. 1, communication messages are transmitted between an infrastructure 12 and a vehicle 14.

The infrastructure 12 includes road side equipment RSE 16 in communication with a traffic light unit 18. Alternatively, other stop signal markings/indicators may be used, but not limited to a stop sign marking, a rail crossing sign marking, and a pedestrian sign marking. In a V2V system, a vehicle may communicate stopped/collision warning messages relating to the location of the stopped vehicle. Referring again to the infrastructure shown in FIG. 1, the RSE 16 includes a roadside application processor for processing data relating the stopping condition at the intersection. Such data may include, but is not limited to, stopping location, and/or the time remaining until traffic light signal changes to stop condition (e.g., time-to-red). The RSE 16 is in communication with the traffic light unit 18 and a traffic signal controller 20 for determining the length of time until the traffic signal unit changes signals and for controlling that communication with the vehicle 12. The infrastructure 12 further includes a wireless communication radio 22 including, but not limited to, dedicated short range communication (DSRC) radio, WiFi, or WiMaX coupled to the RSE processor 16 for transmitting a wireless data message to the vehicle 12 containing the information regarding the stopping location. It should be understood that the data may be transmitted in one or more wireless data messages. The RSE processor 16 may further include intersection map data obtained from an imaging or map database storage device for providing further details in the wireless data message such as the intersection lane geometry, road grade, distance between vehicles approaching the traffic light unit 18 and the stopping location (e.g., intersection stop marking) at the traffic light unit 18. For intersections that require higher positional accuracy (e.g., vehicle lane-level positioning), the RSE processor 16 may further include a GPS augmentation module 19 for providing augmentation information (such as local GPS corrections) which provides further details in the wireless data messages at the traffic light unit 18. The RSE processor 16 may also include local weather information if necessary in the wireless data messages at the traffic light unit 18.

The vehicle 14 includes a controller 24 for processing received data messages broadcast by the RSE 16. Data messages received by the RSE 16 are received via the in-vehicle wireless communication radio 26.

The controller 24 is also coupled to a GPS receiver 28 for receiving GPS data for determining a global positioning of the vehicle. The controller 24 may be in communication with other devices that either sense or assist in determining environmental conditions affecting the stopping of the vehicle. The controller 24 may also be in communication with one or more vehicle subsystems, such as a brake control module, for determining the velocity or acceleration of the vehicle. The controller 24 processes the data messages, the GPS data and the vehicle speed/acceleration and determines whether a potential traffic signal or stop sign violation may occur. A driver warning is provided to the driver accordingly through a driver vehicle interface 29. The driver warning for alerting the driver of the upcoming stopping location may include, but is not limited to, an audible, visual, haptic signal or other vehicle control actions (e.g., automatically brake to avoid an imminent intersection collision). For example, a visual warning may include a graphic display icon on a driver vehicle interface display. The graphic display can be a picture of the stopping condition ahead (e.g., a stop sign, a traffic light, or a target warning indicating a stopped vehicle/collision). Alternatively, the visual warning may be displayed on a windshield in a head up display. Audible warnings may include any type of sound including bells, buzzer, or voice warning. Haptic signals based on a sense of touch may be transmitted through such methods including but not limited to, sensation through the steering wheel or vibration through the vehicle seat.

It should be understood that the vehicle system for determining when to issue the alert warning may be a stand alone module or may be integrated with an existing automated cruise control headway configuration control.

Figure 2:
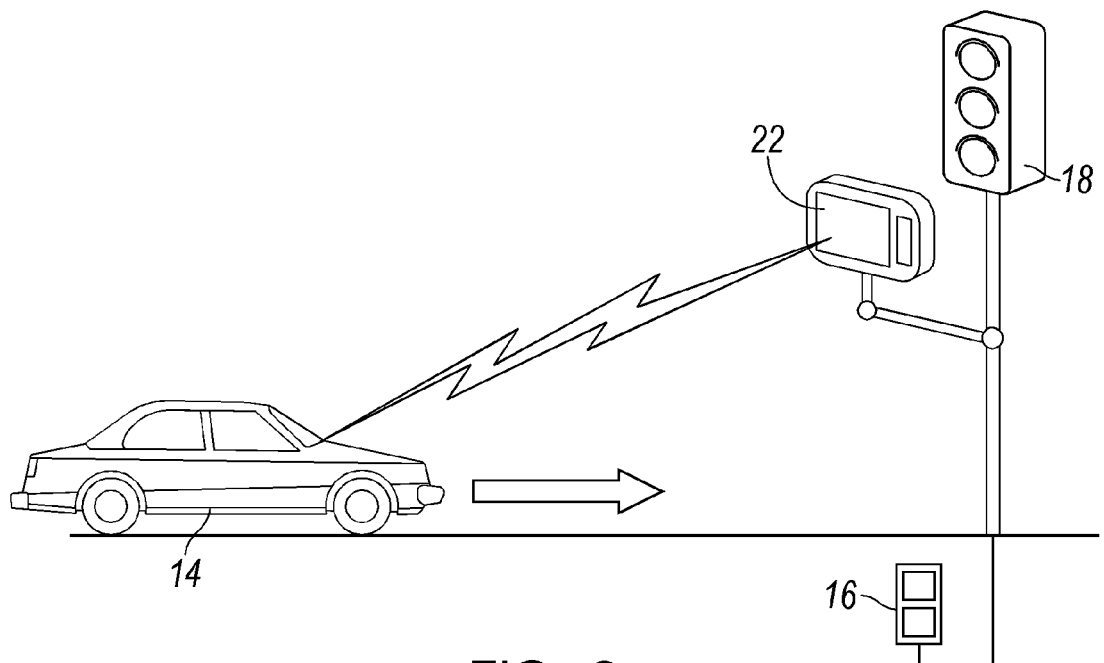
FIG. 2 is a is a graphical concept representation of the vehicular warning system according to an embodiment of the invention FIG. 3 graphical illustration of a timing diagram for of the warning and stopping operation according to an embodiment of the invention.

FIG. 2 illustrates a graphical representation of the communication between an infrastructure 12 at a respective intersection and the vehicle 14. The turn traffic light unit 18 is disposed at the intersection for visually signaling a driver of the vehicle of the stop-caution-go conditions at the intersection.

The RSE 16 is in communication with the traffic light unit 18 for determining the stop-go conditions at the intersection. The wireless communication radio 26 is coupled to the traffic light unit 18 or other nearby structure and is in communication with the RSE 16 for broadcasting messages to the vehicle 14 regarding the stopping conditions at the intersection.

Figure 3:
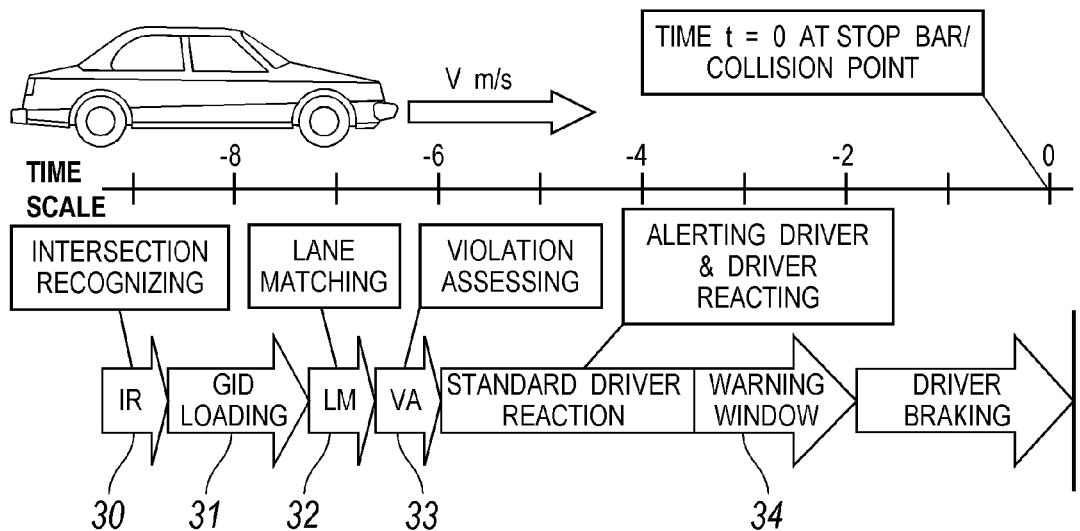

FIG. 3 shows a graphical illustration of a timing diagram of the alert warning system. In timing block 30, intersection recognition is performed that includes identification of an intersection in the road of travel that includes a stopping condition. Intersection recognition may be determined using the intersection reference information and GPS data received by the GPS receiver.

In block 31, Geometric Intersection Map Description (GID) is loaded into the vehicle controller which assists in identifying the geographical layout of the intersection. That is, the intersection may have three lanes approaching an intersection with one through-lane, a left turn lane, and a right turn lane. Depending on which lane the vehicle is traveling in will determine whether a respective warning should be provided given that each of the lanes may have different times that the traffic light signal turns to red. The GID may be received real-time from the infrastructure or is already reside in the vehicle controller downloaded from an earlier vehicle-to-infrastructure encounter.

In block 32, lane matching is performed. The vehicle is mapped to a respective lane and a signal approach that the vehicle is traveling in. The identification of the lane of travel assists in determining whether the vehicle approaching the intersection in the particular lane will be in violation of the traffic signal given time-to-red of that particular lane.

In block 33, a lane violation assessment is performed. The threat of violating the stop signal based on the velocity and acceleration (i.e., negative acceleration or positive acceleration) and distance from the intersection is used to determine whether a warning should be provided to the driver of the vehicle. That is, for a vehicle traveling at an instantaneous vehicle speed showing no indication of a deceleration based on the speed and distance to the stopping location (e.g., instantaneous vehicle position from the stopping location), a determination is made whether a warning should be issued. It should be noted that such a determination is contingent on whether a stop signal violation will occur. If the intersection includes a traffic light signal, then information is sent by the RSE infrastructure to the vehicle providing details as to what the stage the traffic light signal is currently in and when the signal will change to a red condition. This allows the controller of the vehicle to ascertain whether the vehicle may travel through the intersection at the current speed without a signal violation occurring or whether the vehicle will violate the traffic signal.

In block 34, an advance notice period for issuing a warning to the driver is determined in response the determination in block 33 that the vehicle will be violating the traffic signal. The time for alerting a driver includes a standard driver reaction time in addition to a warning window time that is personalized based on a driver preference for receiving the warning. The minimum distance for a vehicle to stop is determined by the following formula:

$$d_{stop\_warn\_min} = d_{reaction} + d_{braking} = v * t_{react} + \frac{v^2}{2*a}, \quad (1)$$

where $d_{reaction}$ is the distance that a vehicle will travel before reacting to a warning to apply braking to the vehicle, and $d_{braking}$ is the distance that the vehicle will travel before stopping the vehicle based on the current velocity and deceleration applied to the vehicle.

Based on the above formula, a minimum time to warn may be determined. The minimum time to warn may be defined as warning the driver as late as possible in order to stop the vehicle with maximum permissible braking. The minimum time to warn may be represented by the following formula:

$$t_{warn\_latest} = t_{react} + \frac{v}{2*a}, \quad (2)$$

where $t_{react}$ is the standard time determined through human factors research that a driver will take to react to a warning for applying the vehicle brakes, v is the velocity of the vehicle, and a is the acceleration of the vehicle.

The driver of the vehicle may modify the warning time as described above to provide a more advanced warning of the stopping condition forward of the vehicle. Since various drivers react differently to traffic signal warnings, the driver of the vehicle may configure the warning so that additional time is added to the warning to allow the driver additional time to react. The formula for adding a warning time to the latest warning time as discussed above is represented by the following formula:

$$t_{warn\_earliest} = t_{warn\_windows} + t_{react} + \frac{v}{2*a}, \quad (3)$$

where $t_{warn\_window}$ is the extra warning time that is added to the minimum time to warn the driver of the upcoming stopping condition.

Figure 4:
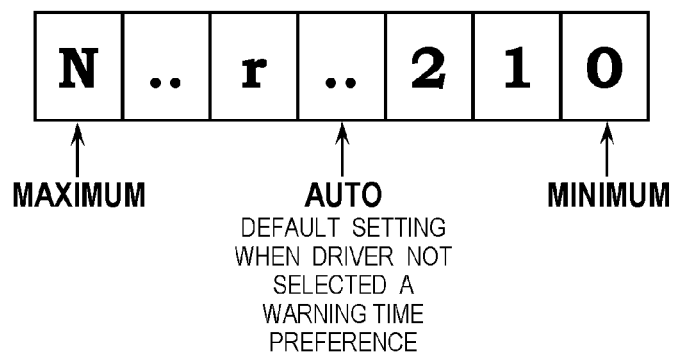
FIG. 4 is a schematic of the selectable driver configured increment according to an embodiment of the invention.
Figure 5:
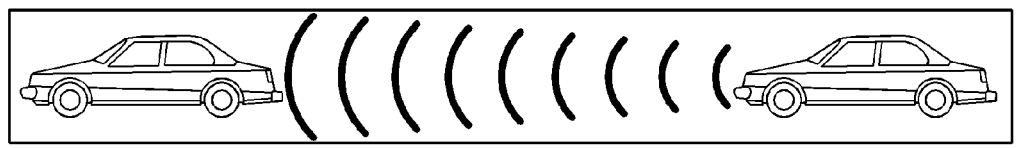
FIG. 5 is a graphical illustration of the driver configured increment according to an embodiment of the invention.

In the embodiment shown in FIG. 4, a plurality of settings are offered to driver so that the driver may configure the alert warning to the driver's preference for providing additional time to warn the driver earlier than what the minimum time warning provides. The display as shown in FIG. 4 is for illustrative purposes and may be displayed to the driver in any form such as a human machine interface graphical icon shown in FIG. 5. The number of settings as illustrated in FIG. 4 is for exemplary purposes only and it should be known that the number of settings may be more or less than what is shown. Each driver configurable setting corresponds to an extra warning window time of a predetermined amount. For example, an initial setting may have a warning window time of 0 sec. Therefore, no extra warning time would be factored into the time to warn the driver and the time to warn the driver will be equal to result in eq. (2). Each setting after the initial setting of 0 increments by a predetermined amount (e.g., 250 ms). The extra warning time may be determined by the following formula:

$$t_{warn\_window} = r*T, \quad (4)$$

where r is the setting number selected by the driver, and T is the predetermined time factor (e.g., 250 ms). Based on equation (4), if 250 ms is the predetermined time factor and if 2 is selected by the driver as the setting number, then a time of 500 ms is used as the additional warning time in eq. (3).

The driver of the vehicle may select an auto setting or if the driver of the vehicle fails to select a warning window setting, the warning setting will default to the auto warning. For example, the auto warning setting can be a mid level warning with an automatic online adaptation based on a variety of factors. Some of the factors include, but are not limited to, environmental factors such as rain, ice, poor ambient light, and road grade. In addition, a warning/violation history factor may be included that relates to a number of correlated warnings ($N_{war}$) and braking events within a past time window or past distance (e.g., last 25 miles). The auto warning setting may be determined by the following formula:

$$t_{warn\_window} = r_{auto} + (K_{rain} + K_{ice} + K_{light} + K_{road} - K_{war}*N_{war})*T \quad (5)$$

where $r_{auto}$ is a default driver selectable setting, and $K_{rain}$ is a weight factor for rain, $K_{ice}$ is a weight factor for ice, $K_{light}$ is a weight factor for ambient lighting conditions, $K_{road}$ is a weight factor for road grade conditions, $K_{war}$ is a weight factor for driving behavior. $N_{war}$ is a number of warnings-brake events within a past time window, T is a predetermined time constant. The length of this time window is determined by human factors studies and/or empirical driving data. A suitable driven distance may also be used instead to determine the number of warnings-brake events.

Figure 6:
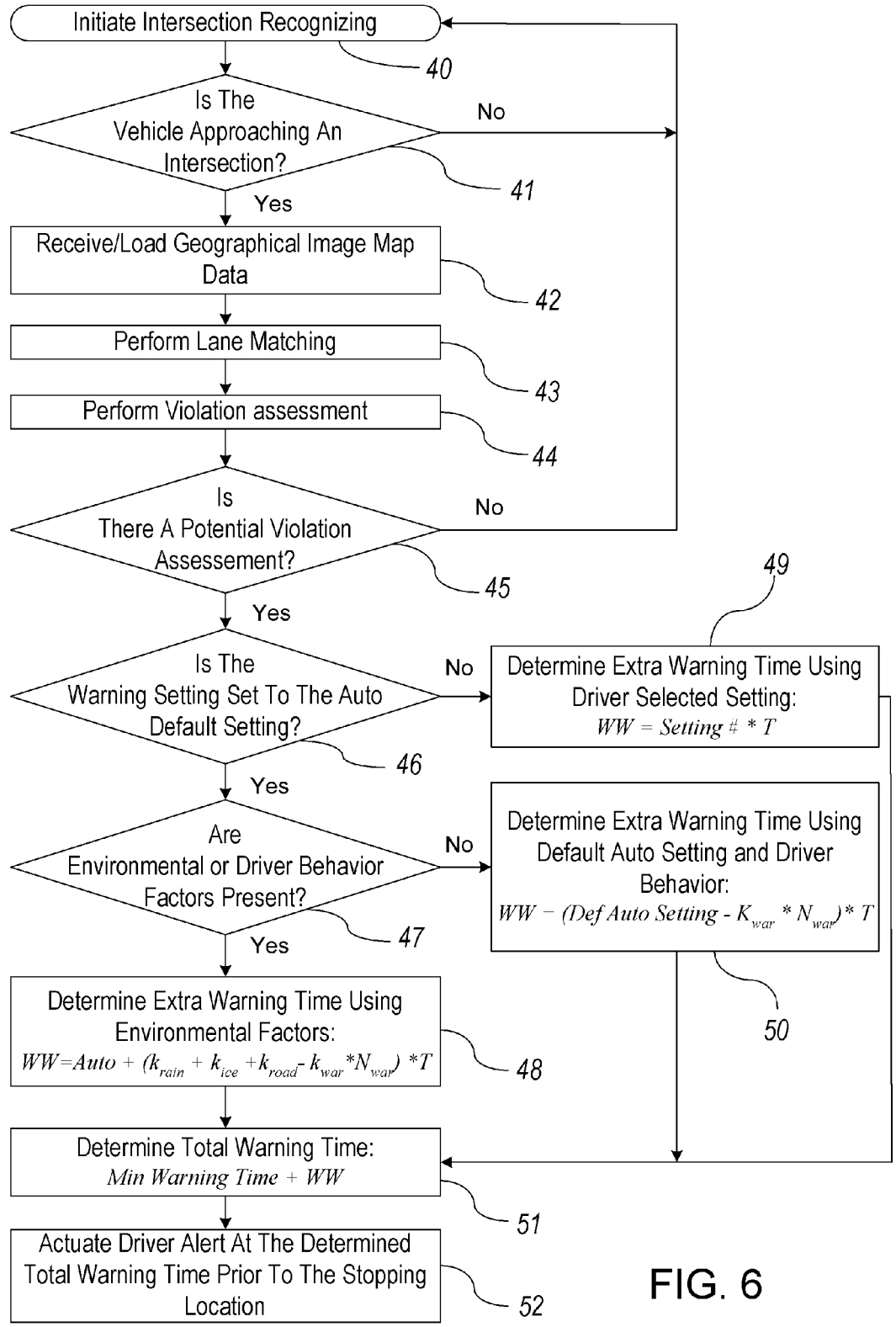
FIG. 6 is a flowchart of a method of the alert warning process according to an embodiment of the invention.

FIG. 6 illustrates a flowchart of a method for providing a warning to a driver of an upcoming stopping location forward of the vehicle. In step 40, intersection recognition is performed that involves recognizing a respective intersection having a stop signal or similar stopping condition at the respective stopping location. Examples include of stop signals include traffic light signals, stop signs, and stopped vehicle/collisions. The stopping location for a traffic light or a stop sign is designated as the line marking on the road of the intersection. A stopped vehicle or collision is the location of the stopped vehicle as provided in the V2V message. Further determination of the intersection type such as rail road crossings, pedestrian crossings, high traffic, high accident intersections are conducted as necessary when such information are available.

In step 41, a determination is made if a respective intersection is identified having a stopping signal or similar stopping condition is recognized. If no respective intersection is recognized, a return is made to step 40 to continue monitoring for upcoming intersections. If an intersection having a stop signal or similar stopping condition is recognized, then the routine proceeds to step 42.

In step 42, the GID data is loaded for that respective intersection. In step 43, lane matching is performed to match the vehicle to respective lane as shown in the GID data. The identification of the lane of travel of the vehicle assists in determining whether the vehicle approaching the intersection in the particular lane will be in violation of the traffic signal stopping condition (e.g., time-to-red) for that particular lane.

In step 44, traffic signal violation is assessed. This includes assessing whether the vehicle will violate the stopping condition based on the vehicle's velocity, acceleration, brake status, and distance to the stopping location.

In step 45, a determination is made whether there is a potential traffic signal violation. If a determination is made that there is no violation, then a return is made to step 40. If a determination is made that there is a potential traffic signal violation, then the routine proceeds to step 46.

In step 46, a determination is made as to whether the warning setting is set to the auto default setting. If the auto default setting is not enabled, then the routine advances to step 49.

In step 49, the controller within the vehicle determines the driver selected warning setting. Based on the driver selected warning setting, the extra warning window time is determined by multiplying the setting number by the predetermined time threshold.

In step 51, the advance warning period (i.e., total warning time) is selected by summing the extra warning time (as determined in step 49) and the minimum warning time. In step 52, the driver of the vehicle is warned of the upcoming stopping location when the vehicle is at a time equal to the total warning time from the stopping location.

In step 46, if the determination was made that the warning setting is set to the auto default setting, then the routine proceeds to step 47. In step 47, a determination is made whether any environmental factors are present that may affect the vehicle deceleration, which include, but are not limited to, rain, ice, low ambient lighting, and road grade. A determination is also made whether driving behavior factor should be considered to reduce the sensitivity to nuisance (too early) alerts. If the determination is made in step 46 that that none of the environmental factors are present, then the routine proceeds to step 50.

In step 50, the extra warning time is determined. The extra warning time is determined by multiplying the default auto setting # by the predetermined time threshold. The routine proceeds to step 51 for determining the total warning time using the extra warning time derived in step 50.

If a determination is made in step 47 that the environmental factors are present, then the routine advances to step 48. In step 48, the extra warning time is determined by the formula described in eq. 5. The routine then proceeds to step 51 to determine the total warning time using the extra warning time derived in step 48.

In step 52, a driver alert is actuated for warning the driver of the upcoming stopping location when the vehicle is at a time equal to the total warning time from the stopping location.

While certain embodiments of the present invention have been described in detail, those familiar with the art to which this invention relates will recognize various alternative designs and embodiments for practicing the invention as defined by the following claims.

What is claimed is:

1. A method for determining when to issue an alert warning to a driver of a vehicle relating to an upcoming stopping location in a road of travel, the method comprising the steps of:
    a receiver receiving a wireless message transmitted from a remote entity to the vehicle, the message containing position data for determining a distance to the stopping location in the traveled road;
    a GPS receiver retrieving GPS data relating to instantaneous vehicle position in the road of travel;
    determining an instantaneous vehicle speed;
    determining a travel time until the vehicle reaches the stopping location via a controller;
    detecting whether the driver has initiated braking;
    determining an advance notice period via the controller for issuing a warning to the driver to decelerate the vehicle, the advance notice period comprising the travel time plus a predetermined reaction time plus a selectable driver configured increment, the selectable driver configured increment allowing the driver to selectively configure the advance notice period to modify a time to issue a warning to alert the driver of the vehicle to initiate deceleration of the vehicle;
    wherein the advance notice period is represented by the following formula:

$$t_{warning\_earliest} = t_{warn\_window} + t_{react} + \frac{v}{2*a}$$

where $t_{warn\_window}$ is the additional time added to the lead time to warn the driver, $t_{react}$ is is a typical reaction time of a driver reacting to a warning signal and initiating an action for decelerating of the vehicle; v is the speed of vehicle of the vehicle, and a is an average value for the deceleration of the vehicle;
    wherein, in the absence of a selectable driver configured increment, the default value for $t_{warn\_window}$ is determined by the following formula:

$$t_{warn\_window} = r_{auto} + (K_{rain} + K_{ice} + K_{light} + K_{road} - K_{war} * N_{war}) * T$$

where $r_{auto}$ is a default driver selectable setting, $K_{rain}$ is a weight factor for rain, $K_{ice}$ is a weight factor for ice, $K_{light}$ is a weight factor for ambient lighting conditions, $K_{road}$ is a weight factor for road grade conditions, $K_{war}$ is a weight factor for driving behavior, $N_{war}$ is a number of warnings-brake events within a past time window, and T is a predetermined time constant; and
    actuating a sensory warning by a driver vehicle interface device to the driver of the vehicle when the advance notice period is less than the travel time and the driver has not initiated braking.

2. The method of claim 1 wherein the selectable driver configured increment further includes a plurality of settings each selectable by the driver to modify the time of the advance notice period to the driver.

3. The method of claim 2 wherein the selectable driver configured increment is set to the default setting in the absence of a driver selection.

4. The method of claim 2 wherein the default $t_{warn\_window}$ value is modified, in the presence of a driver selection, based on the following formula:

$$t_{warn\_window} = r * T$$

where r is a driver number of the driver selectable setting, and T is a predetermined time constant.

5. The method of claim 2 wherein the plurality of setting includes an initial setting of zero, and wherein each setting after the initial setting increments the advance notice period by predetermined amount of time.

6. The method of claim 1 wherein the message contains data relating to a traffic light lane marking.

7. The method of claim 6 wherein the message further contains data relating to the time the traffic light turns red.

8. The method of claim 1 wherein the advance notice period further comprises increments corresponding to environmental conditions and driving behavior.

9. The method of claim 1 wherein the message transmitted by the remote entity is transmitted as an infrastructure-to-vehicle communication.

10. The method of claim 1 wherein the message transmitted by the remote entity is transmitted as a vehicle-to-vehicle communication.

11. The method of claim 1 wherein the message contains data relating to a stop sign lane marking.

12. The method of claim 1 wherein the message contains data relating to a rail crossing sign marking.

13. The method of claim 1 wherein the advance notice period is based on stopping the vehicle at a stop light signal lane marking.

14. The method of claim 1 wherein the advance notice period is based on stopping the vehicle at a stop signal marking.

15. The method of claim 1 wherein the advance notice period is based on stopping the vehicle at a stopped vehicle forward of the vehicle.

16. A vehicular warning system for alerting a driver of a vehicle of an upcoming stopping location in a road of travel, the system comprising:
    a host vehicle receiver for receiving a remote wireless message from a remote entity transmitting unit for transmitting the wireless message, the wireless message including position data relating to a stopping location in the traveled road of the driven vehicle;
    a GPS receiver for determining an instantaneous vehicle position in the traveled road;
    a controller for determining a travel time to reach the stopping location in response to the remote wireless message data and the instantaneous vehicle position determined by the in-vehicle GPS, the controller determining an advance notice period for issuing a warning to the driver to initiate deceleration of the vehicle in response to travel time plus a predetermined reaction time plus a selectable driver configured increment, the controller further determining a braking status of the vehicle;
    wherein the advance notice period is represented by a formula based on the following factors:
    where $t_{warn\_window}$ is the additional time added to the lead time to warn the driver, $t_{react}$ a typical reaction time of a driver reacting to a warning signal and initiating an action for decelerating of the vehicle, v is the speed of vehicle of the vehicle, and a is an average value for the deceleration of the vehicle;

wherein, in the absence of a selectable driver configured increment, the default value for $t_{warn\_window}$ is determined by a formula based on the following factors:

where $r_{auto}$ is a default driver selectable setting, $K_{rain}$ is a weight factor for rain, $K_{ice}$ is a weight factor for ice, $K_{light}$ is a weight factor for ambient lighting conditions, $K_{road}$ is a weight factor for road grade conditions, $K_{war}$ is a weight factor for driving behavior, $N_{war}$ is a number of warnings-brake events within a past time window, and T is a predetermined time constant; and a driver vehicle interface for actuating a sensory warning to the driver of the vehicle if the advance notice period is less than the travel time and the driver has not initiated braking.

17. The vehicle warning system of claim 16 wherein the wireless message further includes data relating to lane and intersection geometry data, weather information, road grade and road condition data, work zone information, traffic data, or accident risk information.

18. The vehicular warning system of claim 16 wherein the controller for determining a travel time is integrated as part of an automated cruise control configuration unit.

19. The vehicle warning system of claim 16 wherein the remote entity transmitter includes a vehicle-based transmitter.

20. The vehicle warning system of claim 16 wherein the remote entity transmitter includes a road side equipment infrastructure-based transmitter.

* * * * *